United States Patent Office 3,751,480
Patented Aug. 7, 1973

3,751,480
PREPARATION OF AROMATIC ALDEHYDES AND
THE CORRESPONDING ALCOHOLS
Jean-Claude Brunie, Michel Costantini, and Noel Crenne,
Lyon, and Michel Jouffret, Villeurbanne, France, assignors to Rhone-Poulenc S.A., Paris, France
No Drawing. Filed Mar. 3, 1970, Ser. No. 16,214
Claims priority, application France, Jan. 14, 1970,
7001234
Int. Cl. C07c 45/00
U.S. Cl. 260—599
9 Claims

ABSTRACT OF THE DISCLOSURE

Mixtures of aromatic aldehydes with their corresponding alcohols, and consisting predominantly of the aldehyde, are produced by decomposing the corresponding aromatic hydroperoxide in the presence of a metal salt the cation of which exhibits Brönsted acidity in aqueous solution or oxide which exhibits Brönsted acidity in aqueous solution.

The present invention provides a process for the preparation of mixtures of aromatic aldehydes with the corresponding alcohol.

For many years the preparation of aromatic aldehydes, such as benzaldehyde, has essentially been effected by hydrolysis of a (dichloromethyl)phenyl compound. However, the aldehydes prepared in this way are contaminated by corrosive chlorine-containing impurities and require a laborious, time-consuming and expensive purification if they are intended for high quality uses such as perfumery.

In French Pat. 1,366,078 a process for the preparation of a mixture of benzaldehyde with benzyl alcohol has been described which is free from these disadvantages. According to this process, toluene is oxidised by air in the liquid phase in the absence of a catalyst at a temperature between 170° C. and 220° C., and the oxidation solution is then heated to a temperature from 180° C. to 200° C. to decompose the hydroperoxide formed. This decomposition may also be carried out at a lower temperature if a catalyst such as a cobalt carboxylate or a borate is added.

This process leads to good combined yields of benzaldehyde mixed with benzyl alcohol; however, the yield is principally benzyl alcohol.

The process of the present invention makes it possible to prepare mixtures consisting essentially of an aromatic aldehyde and the corresponding alcohol and containing a major proportion of the aldehyde.

According to the present invention there is provided a process for preparing a mixture of an aromatic aldehyde with the corresponding alcohol which comprises subjecting a hydroperoxide of the general formula:

$$ArCH_2OOH$$

in which Ar represents a monovalent substituted or unsubstituted aromatic radical, in the liquid phase at a temperature between 20° C. and 180° C., to the action of a deperoxidising catalyst comprising a metal salt the cation of which exhibits Brönsted acidity in aqueous solution or a metal oxide which, in aqueous solution, exhibits Brönsted acidity, an amount of water at least equal to that which is formed by the deperoxidation reaction being present in the reaction mixture throughout substantially the whole of the reaction. In practice this minimum amount of water usually corresponds to an amount close to one mol of water per mol of hydroperoxide employed.

Among the hydroperoxides of the above general formula which may be used are those in which the radical Ar possesses the general formula:

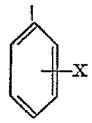

in which X represents hydrogen or chlorine, alkyl, preferably lower alkyl, such as methyl or t-butyl, alkoxy, preferably lower alkoxy, such as methoxy, nitrile or nitro. Hydroperoxides in which the radical Ar has the general formula:

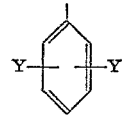

in which Y represents alkyl, preferably lower alkyl, such as methyl or t-butyl, may also be used. In particular, the radical may preferably be benzyl, p-methylbenzyl, p-methoxybenzyl, p-cyanobenzyl or 3,5-dimethylbenzyl.

The terms "lower alkyl" or "lower alkoxy" used herein denote alkyl or alkoxy radicals containing from 1 to 4 carbon atoms.

The hydroperoxides may be used in solution or suspension in water. For technological and economic reasons it is then advantageous to employ amounts of water such that the proportion of hydroperoxide in the solution or suspension is 2% to 20% by weight.

The process may also be carried out in the presence of an organic solvent for the hydroperoxide, which need not be miscible with water. This solvent may, for example, be a linear or cyclic ether, an alcohol, such as a lower alkanol, an organic acid, such as a lower alkanoic acid, or a hydrocarbon. Preferred such organic solvents are alkanes of 6 to 20 carbon atoms, cycloalkanes of 6 to 16 ring carbon atoms optionally substituted by lower alkyl, benzene and its homologues which are mono- or poly-substituted by halogen, lower alkyl, lower alkoxy, nitrile, nitro, or phenyl derived from one of the substituted benzene derivatives mentioned above. It is also possible to use fused polycyclic aromatic hydrocarbons which are partially or totally hydrogenated, such as tetra- and deca-hydronaphthalene.

For the reasons referred to above, it is then advantageous to employ such amounts of water and of organic solvent that the proportion by weight of hydroperoxide in the mixture is between the values given above.

The acidity, in aqueous solution, of the cations of the metal salts or oxides which may be used as catalysts is defined in the Brönsted rather than in the classical, or in the Lewis, sense. Thus, if the cations of the metal salts to some extent hydrolyse in aqueous solution to produce hydrogen ions, or if the metal oxides react with bases to form salts or produce hydrogen ions on aqueous dissolution, they are considered to exhibit Brönsted acidity. Metal salts the cations of which exhibit Brönsted acidity include the soluble salts of alkaline earth metals and metals of Groups IV-A, V-A, VI-A, VII-A, VIII, I-B, II-B, III-B, IV-B and V-B of the periodic classification of the elements according to Mendeléeff. (With regard to the metals of Groups III-B to V-B, the definition given by Pauling: "College Chemistry," chapter 24, is referred to.)

The anionic moiety of such metal salts may, depending on the metal in question, be halide, sulphate, nitrate, chromate, formate, acetate, oxalate, lactate, tartrate, arylsulphonate, benzoate, salicylate or glycerophosphate. However, since it is preferred to employ salts the aqueous solution of which exhibit Brönsted acidity and since the bases corresponding to metals of these salts are weak, it is preferred to employ an anionic moiety derived from a strong acid such as chloride, nitrate, or sulphate. The preferred cationic moieties are those derived from the transition metals, especially from copper, iron and vanadium.

Metal oxides which exhibit Brönsted acidity include the acidic oxides of vanadium, manganese, rhenium, and particularly the acidic oxides of chromium, molybdenum and tungsten.

The amount of deperoxidation catalyst employed is from 0.05 to 20, and preferably from 0.1 to 15, gram atoms of elementary metal per 100 mols of hydroperoxide employed.

The reaction temperature depends to a certain degree on the catalyst employed. Thus with salts derived from iron and vanadium, satisfactory reaction speeds are achieved from ordinary temperature (20° to 25° C.) upwards. In the case of the oxides and salts derived from the other metals it is generally necessary to heat the mixture, at least at the start of the reaction; satisfactory reaction speeds are then achieved without it being necessary to heat above 180° C. and temperatures below 150° C. are generally very suitable.

In practice, in order to carry out the process according to the invention, the hydroperoxide, the water and, where relevant, the organic solvent are mixed at ordinary temperature, the catalyst added, and thereafter the mixture is heated, where appropriate, to the chosen temperature. According to a further feature of the invention, the catalyst can be introduced into the mixture of the other constituents previously heated to the chosen temperature. Where the mixture comprises immiscible phases it is advisable to promote contact by any known means of stirring which is used when dealing with such systems.

As the reaction is exothermic, the temperature can subsequently be regulated by any known system suitable for removing the heat generated by the reaction. Depending on the nature of the catalysts, their proportion and the temperature employed, the duration of the reaction can vary from some minutes to some hours. Where the temperature employed is above the boiling point of the mixture, the reaction can be carried out in an apparatus placed under pressure; where appropriate, the introduction of an inert gas such as nitrogen or argon can be used to keep the mixture in the liquid phase. At the end of the reaction, the aldehyde and the alcohol can be separated from the final mixture by known means, for example by distillation of the organic phase.

The process of the present invention can be carried out using hydroperoxides obtained by oxidation of the corresponding hydrocarbons with oxygen or any oxygen-containing gas and then extracted from the crude oxidation solution and purified by known processes, for example by preparing the sodium salt, before being subjected to the deperoxidation under the conditions described above. The hydroperoxide can then advantageously be used in solution in a lower alkanol or in the hydrocarbon corresponding to the hydroperoxide.

The process of the present invention can also, however, be carried out using the crude oxidation solutions obtained by the oxidation with air of hydrocarbons of the general formula:

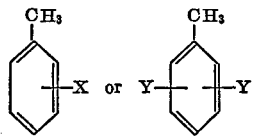

in which X and Y are as defined above, though in this case, more benefit is derived from the process when the oxidation process is specially designed to maximise the yield of the hydroperoxide, the proportion of undesirable products in the primary starting material then being a minimum. Thus, in practice, it is generally advantageous to start from an oxidation product obtained by oxidising the derivative of the above-mentioned formula or in the liquid phase with air, without using a catalyst, optionally in the presence of initiators and stabilising agents for the hydroperoxides, and optionally under pressure, with the temperature and degree of conversion being so chosen as to minimise the production of undesirable products. The oxidation, under these conditons, is generally restricted to less than 10%, preferably between 2% and 7%, by weight of oxidation products in the solution.

As well as hydroperoxide, these oxidation products contain the corresponding aldehyde and alcohol and various other by-products, such as acids and esters. The oxidation product can be adjusted to any desired concentration before being subjected to the treatment according to the invention. As the oxidation is frequently carried out under pressure, a simple means of effecting this concentration is to release the pressure on the hot oxidation product issuing from the oxidising vessel thereby causing boiling of solvent. The acids present can optionally be removed from the oxidation product, whether preconcentrated or not, for example by washing with water or by means of an aqueous solution of an alkali bicarbonate.

The process according to the invention lends itself particularly well to the continuous deperoxidation of these crude oxidation solutions. In this case it is possible to work without external introduction of water and the water formed by the reaction and present in the deperoxidation zone is utilised. The introduction of an additional amount of water however makes it possible to reduce the dwell time and increase the hourly productivity of the equipment.

The following examples illustrate the invention.

EXAMPLE 1

51.7 g. of a solution containing 5.7 g. of p-methylbenzyl hydroperoxide of 80% purity in benzene were introduced into a 100 cm.³ flask equipped with a reflux condenser and a stirrer. A solution of 0.35 g. of iron (II) sulphate heptahydrate in 2 cm.³ of water was then added gradually to the hydroperoxide solution, over the course of 15 minutes, with stirring. During this operation the temperature gradually rose to 67° C. Stirring was continued for 30 minutes and the organic phase was then separated. 4.6 g. of p-methylbenzaldehyde and 0.2 g. of p-methylbenzyl alcohol were determined in the organic phase.

The hydroperoxide employed was prepared as follows: 400 g. of p-xylene were oxidised in the liquid phase at 130° C. for 6 hours with oxygen-enriched air containing 10% by volume of oxygen, in the presence of 0.054 g. of sodium pyrophosphate and 0.45 g. of t-butyl perbenzoate. The volume rate of the passage of air was 9 litres per hour. After cooling, the oxidation solution was washed with water and then extracted with 155 cm.³ of a 1.6 N aqueous sodium hydroxide solution in the presence of 370 cm.³ of n-hexane. The hydroperoxide was liberated from the aqueous phase by adding bicarbonate and was then extracted with diethyl ether.

Finally, the diethyl ether was removed by distillation under reduced pressure.

EXAMPLE 2

580 g. of a solution resulting from the industrial oxidation of toluene and containing 9.9 g. of benzyl hydroperoxide and 9.9 g. of various oxidation products including 2.5 g. of benzaldehyde and 3.2 g. of benzyl alcohol, were introduced into a 2 litre flask equipped as in Example 1. 348 cm.³ of water were then added to this solution which was raised to boiling. 0.8 cm.³ of a solution of 8 g. of chromium (VI) oxide in 92 g. of water were next introduced with stirring. The mixture was kept at the boil (85° C.), stirred for 2½ hours, and then cooled. The organic phase was separated, and 11.05 g. of benzaldehyde and 3.2 g. of benzyl alcohol were determined in the organic phase.

The hydroperoxide solution employed was prepared by industrial oxidation of toluene in the liquid phase at 190° C. under a pressure of 13 bars with oxygen-enriched air containing 10% of oxygen, the oxidation being limited to a 4% content of non-volatile products. The solution was subsequently washed with water using 200 cm.³ of water per kg. of solution and then dehydrated by distilling the water-toluene azeotrope.

EXAMPLE 3

A series of experiments was carried out either in the apparatus described in Example 1 or a stirred autoclave, during each of which a solution of 6.8 g. of benzyl hydroperoxide of 91% purity in 55.8 g. of benzene was introduced. Thereafter a mixture of 6.2 g. of water with a catalyst according to the invention was added thereto, the amount of catalyst employed being such that it introduced 10 gram atoms of elementary metal per 100 mols of hydroperoxide. The mixture obtained was subjected to the conditions shown in the table below. This table also lists the results obtained at the end of each experiment as a function of the nature of the catalyst used.

The hydroperoxide employed was isolated from the industrial oxidation solution obtained as stated in Example 2, by extraction with a 1.5 N aqueous sodium hydroxide solution, addition of sodium bicarbonate to the aqueous solution, extraction by toluene and removal of the toluene by distillation.

28.7 g. of p-methoxybenzylhydroperoxide, 3.4 g. of p-methoxybenzaldehyde and 0.9 g. of p-methoxybenzyl alcohol were introduced into the apparatus described in Example 4(b). The apparatus was closed and fluid heated to 125° C. was then circulated in the external chamber. 20 cm.³ of a solution of iron (II) sulphate heptahydrate and containing 0.6% by weight of metal were then introduced. The mixture was kept at 125° C. for 1¼ hours and, after cooling, 21.5 g. of p-methoxybenzaldehyde and 0.9 g. of p-methoxybenzyl alcohol were determined in the organic phase.

The hydroperoxide employed was prepared as follows: 1000 g. of p-methoxytoluene containing 1.6 g. of t-butyl perbenzoate and 0.2 g. of sodium pyrophosphate were oxidised in a Pyrex glass apparatus at 160° C. with oxygen-enriched air containing 10% by volume of oxygen. The volume rate of the passage of air was 200 litres per hour.

EXAMPLE 6

A solution of 0.1 g. of iron (II) sulphate heptahydrate in 2 g. of water was added with stirring to 50 g. of an aqueous solution containing 3% by weight of benzyl hydroperoxide.

| Catalyst | Temperature | Pressure | Duration (hours) | Benzaldehyde (g.) | Benzyl alcohol (g.) |
|---|---|---|---|---|---|
| VOCl₂ | 25° C (without heating) | Atmospheric | 0.5 | 5.2 | 0.1 |
| FeCl₂·4H₂O | do | do | 0.5 | 5.2 | 0.1 |
| CrCl₃·6H₂O | 72° C (boiling) | do | 4 | 5.2 | 0.1 |
| NiCl₂·6H₂O | do | do | 4 | 4.9 | 0.5 |
| CuCl₂ | do | do | 1 | 4.95 | 0.45 |
| ZnCl₂ | do | do | 4 | 4.9 | 0.5 |
| TiCl₃ | 125° C | Autogenous | 3 | 5.2 | 0.1 |
| MnCl₂·4H₂O | 125° C | do | 3 | 4.6 | 0.65 |
| CoCl₂·6H₂O | 125° C | do | 3 | 3.9 | 1.3 |
| SnCl₄ | 125° C | do | 3 | 5.1 | 0.23 |
| MoO₃ | 125° C | do | 3 | 5.4 | 0 |
| WO₃ | 125° C | do | 3 | 4.25 | 1.1 |
| PdCl₂ | 125° C | do | 3 | 5.0 | 0.25 |

EXAMPLE 4

(a) 60 g. of a solution resulting from the industrial oxidation of toluene and containing 1.54 g. of benzyl hydroperoxide and 1.5 g. of various oxidation products including 0.348 g. of benzaldehyde and 0.41 g. of benzyl alcohol were introduced into the apparatus described in Example 1. 5.7 cm.³ of a solution of iron (II) lactate in water and containing 0.47% by weight of metal were added thereto, with stirring.

The temperature rose gradually to 41° C. The mixture was stirred for a further 30 minutes and the organic phase was then separated off. 1.66 g. of benzaldehyde and 0.55 g. of benzyl alcohol were determined in the organic phase.

(b) The apparatus consisted of a cylindrical apparatus (height: 200 mm., diameter: 170 mm.) of stainless steel, the internal walls of which were rendered passive with sodium pyrophosphate. This cylinder possessed an axial rotating stirrer and an external chamber in which a heating fluid circulated. 50 g. of water and 1000 g. of a solution resulting from the industrial oxidation of toluene, containing 19.1 g. of benzyl hydropexoxide and 19.8 g. of various oxidation products including 3.7 g. of benzaldehyde and 5.1 g. of benzyl alcohol, were introduced into the apparatus. The apparatus was closed and fluid heated to 125° C. was then circulated in the external chamber. 20 cm.³ of a solution prepared by dissolving iron (III) chloride heptahydrate in water and containing 0.19% of metal by weight were then introduced. Heating at 125° C. was continued for 1 hour. After cooling, 19 g. of benzaldehyde and 6 g. of benzyl alcohol were determined in the organic phase.

EXAMPLE 5

50 g. of water and 1000 g. of a solution resulting from the industrial oxidation of p-methoxytoluene containing The temperature rose to 34° C.; the mixture was stirred for a further 30 minutes and then, after cooling, 1.27 g. of benzaldehyde were determined in the final mixutre.

EXAMPLE 7

50 g. of a solution containing 5.45 g. of benzyl hydroperoxide of 91% purity in benzene were introduced into the apparatus provided in Example 1. This solution was heated to 80° C. and 0.2 g. of water and 1.12 g. of iron (II) sulphate heptahydrate were then added to it while stirring. The whole was then heated to 80° C. for 8 hours.

After cooling, 4.2 g. of benzaldehyde were determined in the final mixture.

EXAMPLE 8

A series of experiments was carried out, during each of which 100 g. of a solution of 10 g. of benzyl hydroperoxide of 82.5% purity in 90 g. of benzene was introduced into a 250 cm.³ autoclave agitated by shaking.

A solution of 10 g. of water and a metal derivative according to the invention was then added thereto, the amount of catalyst employed being such that it introduces 1 gram atom of elementary metal per 10 mols of hydroperoxide. The mixture was thereafter heated to 125° C. for 3 hours under autogenous pressure. The table which follows lists the amounts of benzaldehyde determined in the final mixture at the end of each experiment, as a function of the metal derivative used.

| Catalyst | Benzaldehyde (g.) |
|---|---|
| BaCl₂ | 7 |
| Bi(NO₃)₃, 5H₂O | 6.8 |
| PbCl₂ | 7 |
| Tl₂SO₄ | 7 |
| Re₂O₇ | 7 |

EXAMPLE 9

100 g. of a solution resulting from the industrial oxidation of p-xylene, containing 5.14 g. of p-methylbenzyl hydroperoxide, 1.9 g. of p-methylbenzyl alcohol and 1.2 g. of p-methylbenzaldehyde were introduced into the autoclave described in the preceding example.

A solution of 10 g. of water and a metal derivative according to the invention, introducing 1 gram atom of elementary metal per 10 mols of hydroperoxide, was then added thereto. Nitrogen under a pressure of 15 bars was introduced and the mixture was then heated to 125° C. for 3 hours.

The amounts of p-methylbenzaldehyde determined in the final mixture are indicated below as a function of the metal derivative used:

|  | p-methylbenzaldehyde (g.) |
|---|---|
| $MgCl_2$ | 4.6 |
| $AlCl_3$ | 5.4 |

We claim:

1. A process for preparing a mixture of a major amount of an aromatic aldehyde with a minor amount of the corresponding alcohol which comprises subjecting a hydroperoxide of the formula:

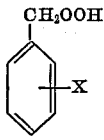

in which X represents hydrogen, chlorine, alkyl, alkoxy, nitrile or nitro, or of the formula:

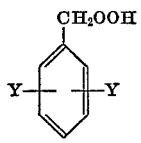

in which Y represents alkyl, in the liquid phase at a temperature between 20° C. and 180° C., to the action of a deperoxidising catalyst selected from the class consisting of a water soluble halide, sulphate, nitrate, chromate, formate, acetate, oxalate, lactate, tartrate, arylsulphonate, benzoate, salicylate or glycerophosphate of an alkaline earth metal or of a metal of Groups IV-A, V-A, VI-A, VII-A, VIII, I-B, II-B, III-B, IV-B and V-B of the periodic classification of the elements according to Mendeléeff, or an oxide of vanadium, manganese, rhenium, chromium, molybdenum or tungsten, which exhibits Brönsted acidity, an amount of water at least equal to that which is formed by the deperoxidation reaction being present in the reaction mixture throughout substantially the whole of the reaction.

2. A process according to claim 1 in which the molar ratio of the amount of water used to the amount of hydroperoxide used is 1:1.

3. A process according to claim 1, in which the deperoxidation catalyst is iron (II) sulphate, chromium (VI) oxide, vanadyl chloride, iron (II) chloride, chromium (III) chloride, nickel (II) chloride, copper (II) chloride, zinc chloride, titanium (III) chloride, manganese (II) chloride, cobalt (II) chloride, tin (IV) chloride, molybdenum (VI) oxide, palladium (II) chloride, iron (II) lactate, barium (II) chloride; bismuth (III) nitrate, lead (II) chloride, thallium (I) sulphate, or rhenium (VII) oxide.

4. A process according to claim 1 in which the amount of deperoxidation catalyst employed is from 0.05 to 20 gram atoms of elementary metal per 100 mols of hydroperoxide employed.

5. A process according to claim 1 in which the reaction is effected at a temperature from 20° C. to 150° C.

6. A process according to claim 1 which is effected continuously.

7. A process according to claim 1 in which the hydroperoxide is decomposed in situ in the crude oxidation solution in which it is formed.

8. A process according to claim 1 in which the hydroperoxide is of formula

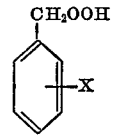

wherein X is hydrogen, lower alkyl, lower alkoxy or cyano, or of the formula

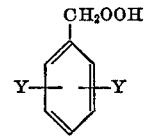

wherein Y is lower alkyl.

9. A process according to claim 8 in which the hydroperoxide is benzyl, p-methylbenzyl or p-methoxybenzyl hydroperoxide.

References Cited

UNITED STATES PATENTS 3,387,036  6/1968  Bonnart et al. _____ 260—599

FOREIGN PATENTS 1,564,916  3/1969  France _____ 260—599 R

BERNARD HELFIN, Primary Examiner

U.S. Cl. X.R.

260—600, 618 C, 613 D, 465 R

UNITED STATES PATENT OFFICE
CERTIFICATE OF CORRECTION

Patent No. 3,751,480  Dated August 7, 1973

Inventor(s) Jean-Claude BRUNIE et al

It is certified that error appears in the above-identified patent and that said Letters Patent are hereby corrected as shown below:

In the Claim for Priority, the second priority application is missing and should be inserted as follows:

--France, Appln. No. 69.06063 filed March 5, 1969.--.

Signed and sealed this 9th day of April 1974.

(SEAL)
Attest:

EDWARD M. FLETCHER, JR.
Attesting Officer

C. MARSHALL DANN
Commissioner of Patents